July 18, 1961 W. HÖFLER 2,992,491
GEAR TESTING APPARATUS
Original Filed Sept. 18, 1956 3 Sheets-Sheet 1
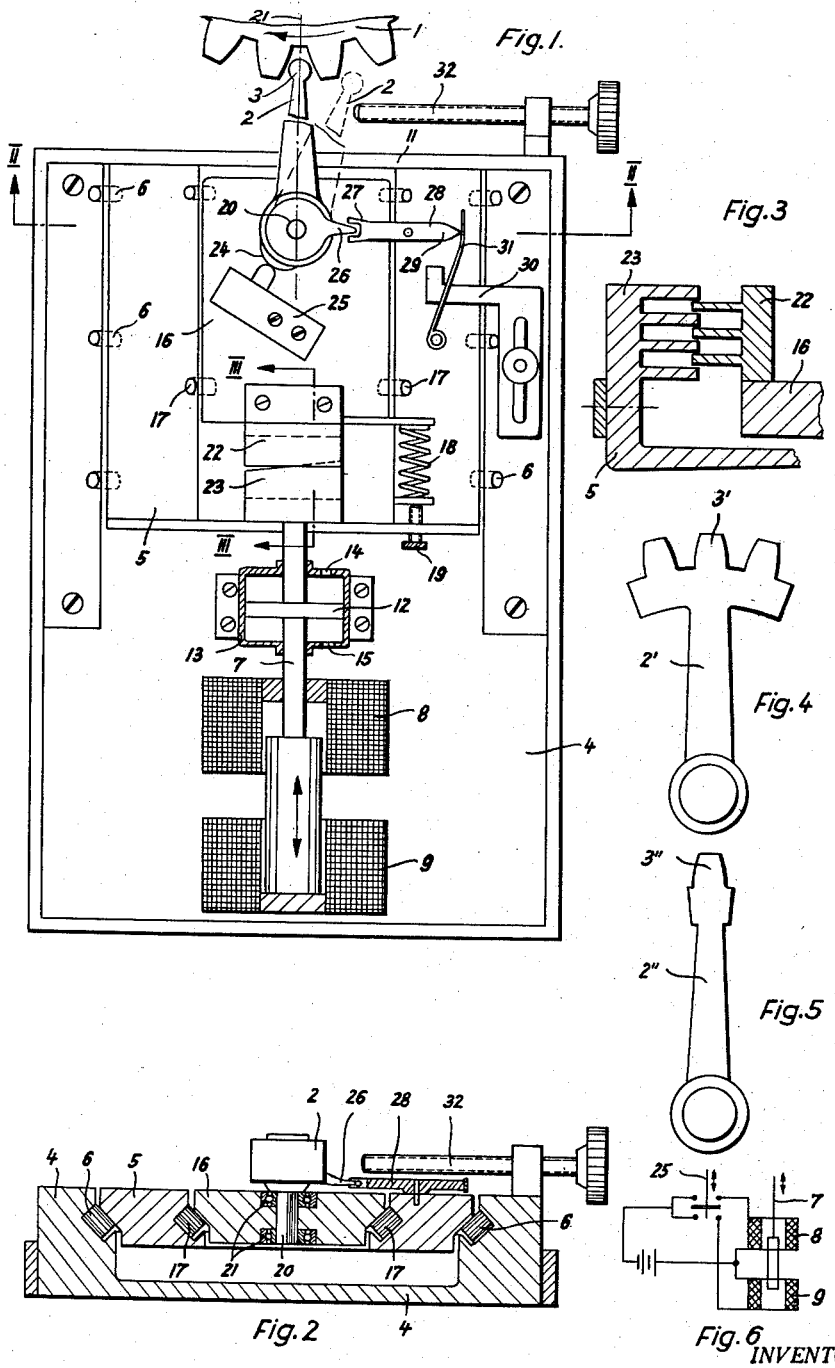
INVENTOR.
WILLY HÖFLER
BY
ATTORNEYS

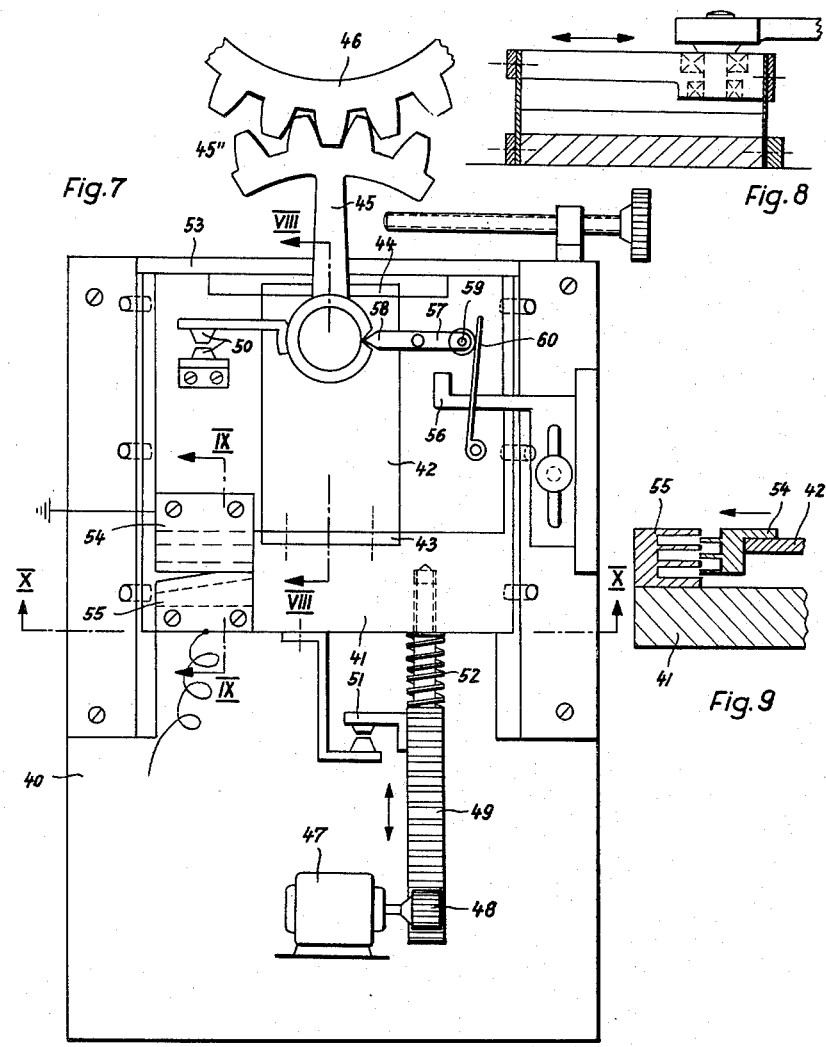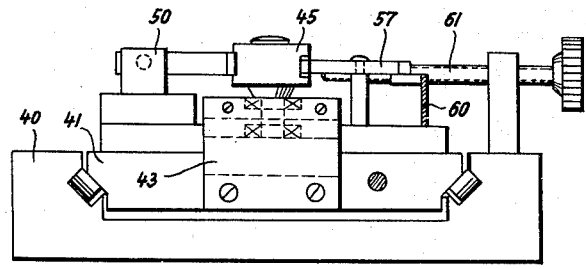

July 18, 1961  W. HÖFLER  2,992,491
GEAR TESTING APPARATUS
Original Filed Sept. 18, 1956  3 Sheets-Sheet 3

INVENTOR.
WILLY HÖFLER
BY
ATTORNEYS

United States Patent Office 2,992,491
Patented July 18, 1961

2,992,491
GEAR TESTING APPARATUS
Willy Höfler, Kriegsstrasse 290, Karlsruhe, Germany
Original application Sept. 18, 1956, Ser. No. 610,464, now Patent No. 2,906,030, dated Sept. 29, 1959. Divided and this application July 6, 1959, Ser. No. 829,480
Claims priority, application Germany Sept. 21, 1955
11 Claims. (Cl. 33—179.5)

The present invention relates to an apparatus for measuring and testing gears and the like. More particularly, the invention relates to an automatically operating apparatus for determining and measuring tooth and tooth-spacing errors of various types, as well as errors of concentricity especially on gears and other objects having gear teeth or the like.

Prior to this invention, various types of testing apparatus have been known in which the test object was measured while at a stand-still and was advanced after each measurement by one tooth pitch either by hand or by a motor or the like so that the next measurement could then be carried out. In order to obtain accurate results and prevent errors in measurement, these apparatus required that the test object was to be advanced by one or more pitches with the utmost precision. This, as well as the intermittent and accurate pitch-by-pitch movement of the test object, required considerable time, as well as special testing devices upon which the test object had to be mounted. It was therefore also particularly difficult to test or measure very large objects, while the testing of built-in parts, such as spur or bevel gears, racks, worms, worm gears, or the like, or gear-cutting tools while mounted in gear-cutting machines was entirely impossible.

It is the object of the present invention to provide an apparatus which overcomes the above-mentioned disadvantages in that the test object does not need to be advanced by exactly one pitch between the individual measurements, but in which such test object is moved continuously and preferably at a constant speed, even while the measurements are being carried out.

A testing or measuring procedure of this kind does not require the test object to be mounted on a special testing device which advances the object by exactly one pitch, and it therefore permits even built-in or very large parts to be tested without difficulty.

A further object of the present invention is to provide an apparatus of the type as described which may be operated and will carry out the required measurements fully automatically.

Another object of the present invention is to provide such a testing and measuring apparatus in which the results of the required measurements are of a very high accuracy, and in which such results may be attained successively and may also be permanently recorded.

A further object is to provide an apparatus of the mentioned kind which may be used for carrying out a large variety of different types of measurements, and particularly for determining and measuring different kinds of tooth and tooth-spacing errors, errors of concentricity, and the like.

The important features of the invention for attaining the above-mentioned objects consist in the provision of a periodically reciprocating slide and of at least one measuring feeler which is pivotally mounted thereon, and of means for pivoting the feeler laterally during the period when the slide is being retracted, for inserting the front end of the feeler during the advancing movement of the slide into a tooth gap of a continuously moving test object prior to the time when the latter reaches the measuring position for permitting the feeler then to be taken along by the moving test object to a point beyond the measuring position and thereby to carry out a pivotal movement, and in the provision of means responsive to the pivotal movement of the feeler for automatically controlling the advance and return movements of the slide.

Broadly speaking, the operation of the new measuring and testing apparatus consists in that one or a pair of measuring feelers, which is inserted into a tooth gap of the continuously moving test object before the latter reaches the measuring position, will by such engagement be taken along by the test object into the measuring position thereof and then be pivoted beyond such position. The test or measurement is then carried out while the test object as well as the feeler move through the measuring position. The further pivoting movement of the feeler or feelers then initiates or controls the periodical retraction and subsequent advance of the slide for the next measuring operation. During such retraction, the feeler is automatically pivoted in the opposite direction to such an extent that it will surely and properly engage into the next tooth gap when the slide again advances.

If gears are to be tested for errors in concentricity of the teeth or for tooth thickness or tooth gap errors, the feeler is preferably provided with a measuring tip made in the form of a ball, wedge, or gear tooth which is to be inserted into the tooth gaps. For errors of concentricity, two-face errors, and the like, the feeler tip is preferably made in the shape of a gear sector. In either of these cases, the radial depth of insertion of the feeler into the tooth gaps of the gear or other test object will be evaluated. The testing unit is for this purpose preferably designed so that the main slide, the movement of which in the direction toward the test object is limited by a stop member, carries a second measuring slide which, in turn, carries the pivotable measuring feeler and is movable toward the test object under the action of a spring which determines the measuring pressure of the feeler and is made adjustable to vary such pressure. After the feeler has been inserted into a tooth gap and into engagement with the tooth faces, the pivotal movement of the feeler caused by the continuous movement of the test object will then cause this second slide to move back from the test object. The maximum distance of this measuring slide from the test object will then be measured and registered by an electric measuring system preferably of the capacitative type. In such measuring procedure, the feeler is inserted into the tooth gap at a point prior to the measuring position and it is then taken along by the test object beyond the so-called "high point," i.e. the measuring position, which will be reached when the axis of rotation of the test object, the pivotal axis of the feeler, and the tip of the latter all fall within a straight line. The measuring slide will therefore at first move away from the test object until the "high point" is reached, and it will then again move toward the test object. A recording of this movement of the measuring slide results in a single-peak curve for each measured tooth pitch, the deviations of the adjacent maximum values relative to each other then constituting a value for determining the tooth spacing and pitch errors, as well as tooth thickness and tooth gap errors, while a deviation of the peak values within such a series of maximum values constitutes a value for determining errors in concentricity.

A further object of the present invention is to provide a measuring apparatus of the kind as described which permits the measuring procedure to be carried out very quickly, with the utmost precision, and with as little inertia as possible, and in which the measuring pressure applied is made as low as possible.

Another important object of the invention is to provide such apparatus in which the measured results will also be automatically and continuously registered or recorded.

The features of the invention for accomplishing these objects consist in providing a variable condenser which forms an element of the electric measuring system of the new apparatus, and in mounting one coating of such condenser on the measuring slide and the other coating on the main slide which is periodically moved toward and away from the test object intermediate the individual measurements of each series but is held in a fixed position during the actual measurements. The changing distance between the condenser coating on the movable measuring slide and such fixed condenser coating results in changes in the condenser capacity which is then electrically evaluated in a manner known as such by means of a heterodyne circuit.

After passing beyond the measuring position, i.e. the so-called "high point," the feeler has to be disengaged from the test object and then to be inserted into the next tooth gap to be measured on the test object which during all this time continues to move without interruption. For this purpose, it is necessary that the main slide carrying the measuring slide together with the feeler be retracted from the test object and subsequently again be advanced toward the same. According to a preferred embodiment of the invention, this may be accomplished by the action of the feeler which, after passing beyond the measuring position, operates an electric switch so as to start the return movement of the main slide. The main slide further carries a pivotable lever, one end of which is flexibly connected with the feeler on the measuring slide, while during the return movement of the main slide the other end of this lever engages upon an adjustable stop which is mounted on a stationary part of the apparatus. Thus, when after the conclusion of each measurement, the feeler has become disengaged from the teeth of the moving test object and is moved backwardly by the retraction of the main slide which also carries the mentioned lever, such retraction also brings the outer or free end of the lever into engagement with the stop member. Since the other end of this lever is flexibly coupled with the feeler, the continued retraction of the main slide will then pivot this other end of the lever which will thus turn the feeler in the direction opposite to its movement by the action of the test object. Such pivotal movement of the feeler will then again actuate the mentioned electric switch so as to start the advancing movement of the main slide. In order to insure that the feeler will be pivoted back to such a degree that its tip will properly enter into the next following tooth gap when the main slide is advanced, a spring is provided to act upon the outer end of the mentioned lever in such a manner that, when the pivotal return movement of the feeler has been initiated by the retraction of the main slide and its action upon the lever as above described, this lever and thus also the feeler will be flipped over by the spring in a manner similar to the operation of a toggle switch until the feeler engages with an adjustable stop member which determines the angle to which the feeler may pivot.

The means provided according to the invention for reciprocating the main slide toward and away from the test object may, for example, consist of a pair of electromagnets which are alternately energized by the operation of the switch which is controlled by the feeler. The common armature of these two magnets which is connected with the main slide so as to drive the same in either direction is preferably provided with a piston which is adapted to be reciprocated in a cylinder so as to act as a shock absorber and produce a smooth and steady movement of the main slide. According to another and preferred embodiment of the invention, the reciprocating means consist of an electric motor, the driving pinion of which engages with a rack so as to advance or retract the main slide. This motor is switched on to rotate in one direction and its movement is then reversed by the operation of the switch which is controlled by the feeler, as above described, and it is cut off by a circuit breaker by means of contactors or the like.

In place of the capacitative measuring system as previously described it is also possible to use an inductively operating system. In that case, the condensers are to be replaced by induction coils of variable induction. Also, instead of recording the measured results which have been evaluated by the measuring system, as previously described, it is also possible to indicate these results in the form of individual values or to reproduce them audibly in the form of sound frequencies which, if desired, may be recorded, for example, on a tape or wire recorder.

It is furthermore possible to use the measured values as control values for an automatic control mechanism which continuously and automatically corrects the errors which have been determined by the new apparatus, for example, on a gear-cutting tool of a gear-cutting machine while the same is in operation, so that the respective workpiece when finished will not be afflicted with the defects and faults of the generating machine.

Further objects, features, and advantages of the present invention will be apparent from the following detailed description, particularly when read with reference to the accompanying drawings, in which—

FIG. 1 shows a plan view of a first embodiment of the testing unit according to the invention;

FIG. 2 shows a cross section taken along line II—II of FIG. 1;

FIG. 3 shows a cross section taken along line III—III of FIG. 1;

FIG. 4 shows a feeler designed in the shape of a gear sector;

FIG. 5 shows a feeler designed in the shape of a gear tooth;

FIG. 6 shows a circuit diagram of the electric connections of the electromagnets of the unit according to FIG. 1;

FIG. 7 shows a plan view of a second embodiment of the testing unit according to the invention;

FIG. 8 shows a partial cross section as taken along line VIII—VIII of FIG. 7;

FIG. 9 shows a partial cross section as taken along line IX—IX of FIG. 7;

FIG. 10 shows a cross section taken along line X—X of FIG. 7;

Figure 11:
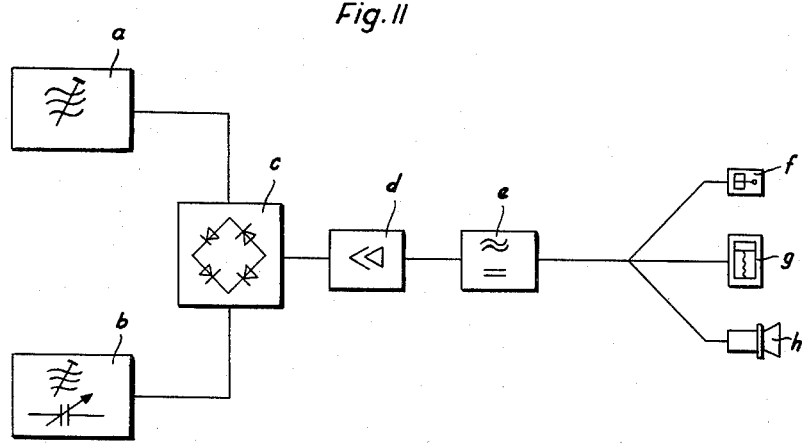
FIG. 11 shows a unit circuit diagram of the measuring system.

Referring to the drawings, and first particularly to FIGS. 1 to 6, showing the first embodiment of the testing unit according to the invention, the test object, which in this testing example is shown in the form of a gear, is driven in the direction shown by the arrow by means not shown, and preferably continuously and at a constant speed.

A measuring feeler 2 terminates at one end in a ball 3 which is adapted to engage into a tooth gap of the test object 1. For different types of measurements, feeler 2 may be replaced by one with a measuring end of any other suitable shape, for example, by a feeler 2' or 2", as shown in FIGS. 4 and 5, respectively, which terminates in a gear sector 3' or a gear tooth 3", respectively.

The testing unit as such is independent from the test object 1 and comprises a base 4 on which a main slide 5 is mounted so as to be easily slidable thereon in a longitudinal direction by means of rollers 6. Slide 5 carries a rod-shaped armature 7 which may be reciprocated in the direction shown in FIG. 1 by a two-pointed arrow by two electromagnets 8 and 9 which are secured to base 4 behind each other so that slide 5 may be reciprocated in the direction toward test object 1 by the alternate operation of magnets 8 and 9. A stop ledge 11 at the front edge of base 4 limits the forward movement of slide 5. In order to insure that slide 5 will carry out its movements quickly and smoothly when electromagnets 8 and 9 are alternately energized, an intermediate portion of the connecting rod of armature 7 is provided with a shock absorber consisting of a piston 12 which is mounted on or forms a part of armature rod 7 and is adapted to reciprocate within a cylinder 13 mounted on base 4. Cylinder 13 is provided with small vents 14 and 15 through which the air compressed by piston 12 may only pass slowly either into or out of cylinder 13 so that the movements of slide 5 will thus be damped.

Main slide 5 supports a measuring slide 16 which is easily slidable thereon by means of rollers 17 which are disposed and movable in a direction parallel to rollers 6. Slide 16 is urged constantly in the direction toward test object 1 by a spring 18 which is interposed between and acts upon slides 5 and 16, and the tension of which may be adjusted by a setscrew 19. Slide 16 carries the feeler 2, a vertical pivot pin 20 of which is rotatably mounted within ball bearings 21 on slide 16. When main slide 5 is in its forward end position as shown in FIG. 1 in which it is stopped by ledge 11, the ball-shaped tip 3 of feeler 2 engages into a tooth gap of test object 1. Spring 18 then furnishes the required measuring pressure which may be adjusted by set-screw 19 and under which feeler tip 3 engages with the tooth faces of test object 1.

By such engagement of feeler 2 with test object 1, the movement of the latter in the direction shown in FIG. 1 by the arrow is transmitted to feeler tip 3 so as to pivot feeler 2 in a counterclockwise direction. If the feeler tip 3 is made to engage into a tooth gap of test object 1 when in the outwardly pivoted position indicated in FIG. 1 in dotted lines, slide 16 will then at first be moved forwardly as far as possible toward test object 1 by the action of spring 18. In the course of the pivotal movement of feeler 2 toward the solid line position thereof as shown in FIG. 1, slide 16 is then made to retract from the test object and, after passing beyond this so-called "high point" i.e. the measuring position, it again moves toward test object 1. This "high point" will be reached when the center of gear 1, the pivotal axis 20 of feeler 2, and feeler tip 3 all fall within a straight line 21, as indicated by the dot-and-dash line in FIG. 1. The maximum distance of slide 16 from test object 1 at the time when it passes the "high point" constitutes the value to be measured, and, when measuring one tooth gap after the other, the differences between the individual maximum distances indicate the tooth errors of test object 1. For determining these maximum distances, slide 16 has secured thereto a condenser coating 22 which is operatively associated with another condenser coating 23 which is secured to slide 5. The movements of slide 16 relative to slide 5, which is held arrested in its most forward position, result in changes in distance between condenser coatings 22 and 23 and thus in changes in the capacity of the condenser formed of these two coatings. These changes in capacity are then evaluated in a heterodyne circuit of a type known as such in which such capacity is first converted into a frequency which is compared with an adjustable standard frequency and then amplified and converted into current or voltage values which are finally registered, recorded, or made audible by being transformed into sound frequencies.

After feeler 2 has thus served for measuring one tooth gap in the manner as above described, and after it has passed beyond the "high point," electromagnet 9 will be energized to retract slide 5 and thus also slide 16, whereupon electromagnet 9 will be deenergized and electromagnet 8 energized to advance slide 5 again up to stop ledge 11. Since, during the retracting movement, feeler 2 has been pivoted by a mechanism as subsequently described into the position shown in FIG. 1 in dotted lines, the subsequent advance of slide 5 will then move the measuring tip 3 into engagement with the next following tooth gap of the rotating test object 1.

The operation of electromagnets 8 and 9 is directly controlled by feeler 3 when the latter is being pivoted by the rotating movement of test object 1. For this purpose, the hub of feeler 2 is provided with a cam 24 which, after passing beyond the "high point," actuates a switch 25 as indicated diagrammatically in FIG. 1 and in the circuit diagram of FIG. 6, whereby electromagnet 9 will be energized and slide 5 be retracted.

The hub of feeler 2 further carries a lateral fingerlike projection 26 which engages into the bifurcated end 27 of a two-armed lever 28 which is pivotally mounted on slide 5.

During the retraction of slide 5, the other end 29 of lever 28 engages with a stop member 30 which is adjustably secured to base 4. Lever 28 is thereby pivoted counterclockwise, resulting in a pivotal movement of feeler 2 from the full-line position to the dotted-line position as shown in FIG. 1. After lever 28 has started its pivotal movement by abutting against stop member 30, a spring 31 acting upon the end 29 of lever 28 will then pivot the lever to such an extent that feeler 2 will engage with a setscrew 32 by means of which the angular deflection of feeler 2 may be adjusted to any desired position. Lever 28 and spring 31 thus cooperate with each other in a manner similar to a toggle switch.

During the retraction of slide 5, the pivotal movement of feeler 2 as just described moves cam 24 on the hub of the feeler into engagement with switch 25, thus again actuating the same and thereby disconnecting the electromagnet 9 and connecting electromagnet 8, so that slide 5 will again move forwardly. The same process as above described will then be repeated by the movement of feeler 2 through its engagement with the rotating test object 1, measuring slide 16 thus first retracting from the test object until the "high point" is reached, and then again moving toward the test object. The resulting change in the capacity of the condenser 22, 23 will then be evaluated by the electric measuring apparatus and results in a single-peak curve, the peak value of which constitutes the value to be measured of the respective tooth gap.

FIG. 3 shows a cross section taken through the two condenser coatings 22 and 23 which are of comblike shape and interengage with each other like the condenser plates of a rotary condenser.

A second embodiment of the invention is illustrated in FIGS. 7 to 10 showing a testing unit which is similar in principle to that shown in FIGS. 1 to 6 and as previously described. A base 40 again supports a slide 41 so as to be easily movable thereon on rollers in the longitudinal direction, while slide 41, in turn, supports a measuring slide 42 so as to be movable in the same direction. However, as shown in FIG. 8, slide 42 is not movable on rollers relative to slide 41 but by being suspended on two leaf springs 43 and 44. Slide 42 again supports a pivotable feeler 45 which terminates in a measuring tip 45" designed in the form of a gear sector adapted to engage in the tooth gaps of a test object 46 which also in this example is shown as being in the form of a gear. In place of a pair of electromagnets as used in the first embodiment for reciprocating slide 41, an electric motor 47 is provided, the shaft of which carries a pinion 48 which engages with a rack 49 which, in turn, is connected to slide 41 so as to move the latter toward or away from test object 46, depending upon the direction of rotation of motor 47. The operation of motor 47 is controlled by a switch 50 which is actuated by feeler 45 when being pivoted, and by another switch 51 acting as a circuit breaker which is actuated by the rack 49. Rack 49 is slidable relative to slide 41 and acts upon the same by means of a compression spring 52. Thus, if the forward movement of slide 41 is stopped by its engagement with stop ledge 53 mounted on the front edge of base 40, rack 49 will continue to move in the direction toward the test object 46 against the action of spring 52, at which time switch 51 will be opened so as to stop the rotation of motor 47. During the measuring procedure, slide 41 will be maintained in engagement with stop ledge 53 by the force of spring 52. Rack 49 will be prevented from retracting under the action of spring 52 by the provision of a speed reduction gear (not shown) on motor 47, the brake action of which is of sufficient strength to counteract the tendency of rack 49 to return.

Also in this embodiment, the measuring slide 42 carries a condenser coating 54 which is operatively associated with another condenser coating 55 on slide 41 in the same manner as described with reference to FIGS. 1 to 6. Base 40 also carries an adjustable stop member 56 for limiting the movement of a lever 57 which is pivotably mounted on slide 41 and one end 58 of which is flexibly connected with the hub of feeler 45, while the other end 59 is acted upon by a spring 60 which pivots lever 57 until feeler 45 abuts against a setscrew 61 after such pivotal movement has been started by the engagement of the end 59 of lever 57 with stop member 56.

FIG. 11 shows a unit circuit diagram of the electric measuring system which may be applied in either of the embodiments as shown in FIGS. 1 to 6 and 7 to 10, respectively. It comprises a pair of oscillatory circuits $a$ and $b$, the frequency of the first being dependent upon a change in the capacity of condenser 22, 23 in FIG. 1 or of condenser 54, 55 in FIG. 7, respectively, while oscillatory circuit $b$ produces an adjustable standard frequency. The frequencies produced in circuits $a$ and $b$ are superimposed in a mixing stage $c$ into a heterodyne frequency which is then amplified in an amplifier $d$ and converted into current and voltage values in a transformer $e$, and finally registered by a measuring instrument $f$ or recorded by a recording instrument $g$, or made audible by a loudspeaker $h$, possibly also for being recorded on a tape or wire recorder.

Figure 12:
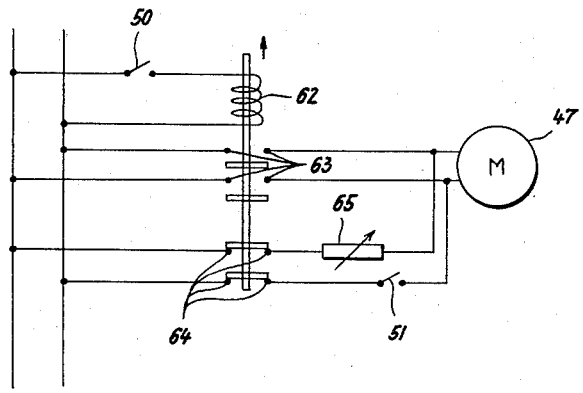
FIG. 12 shows a circuit diagram of the electric connections of the electric motor of the unit according to FIG. 7.

The electric circuit for operating the motor 47 to reciprocate slide 41 will now be described with reference to FIG. 12. After feeler 45 has passed beyond the measuring position, i.e. the "high point," it closes switch 50 and thereby energizes coil 62 of a contactor which, in turn, closes contacts 63 so as to start the rotation of motor 47 in the necessary direction for retracting rack 49. Since switch 51 is directly operated by rack 49, it will be closed at the beginning of such retraction, while the retraction of slide 41 will follow subsequently. As previously described, such retraction of slide 41 will result in a lateral pivoting of feeler 45 whereby switch 50 will again be opened and coil 62 of the contactor be deenergized. Contacts 63 of the contactor will thus be opened and contacts 64 simultaneously closed. The polarity of motor 47 and thus also the direction of rotation thereof will thereby be reversed so that slide 41 will again run forwardly until it engages with stop ledge 53. Since rack 49 is then able to continue in its forward movement against the action of spring 52, it will open switch 51 and thereby disconnect and stop the motor 47, the speed of which may be adjusted by a potentiometer 65, as indicated in FIG. 12. The particular circuit for operating motor 47 as shown in this drawing, being the most simple type, has only been given as an example and may be replaced by any other suitable circuit and control elements as are known as such in the prior art.

Although my invention has been illustrated and described with reference to the preferred embodiments thereof, I wish to have its understood that these embodiments are only given as examples of the manner in which the invention may be carried out and that it is in no way limited to the details of such embodiments but is capable of numerous modifications within the scope of the appended claims.

This application is a division of Ser. No. 610,464 filed September 18, 1956, now Patent No. 2,906,030 issued September 29, 1959.

Having thus fully disclosed my invention, what I claim is:

1. An apparatus for automatically measuring and testing gears and the like comprising means for continuously moving a test object having a plurality of teeth and tooth gaps intermediate said teeth, a main slide adapted to move in a direction toward said test object, a second slide mounted on said main slide and adapted to move in the same direction as said main slide toward said test object and relative to said main slide, at least one measuring feeler pivotably mounted on said second slide for advancing and retracting movement therewith and for turning about an axis perpendicular to the direction of motion of the slides between starting and end positions on the opposite sides of the line of motion of the second slide, means for advancing both slides together with said feeler toward said moving test object to insert the front end of said feeler into a tooth gap thereof, means for limiting the forward movement of said main slide, resilient means acting on said second slide to maintain the front end of said feeler in engagement with the teeth defining said tooth gap when said main slide is in its forward position so that said feeler will then be taken along and pivoted by said moving test object from a starting position to an end position, whereby said second slide will at first be moved away from said test object and then again toward said test object, means for measuring the maximum distance of said second slide from said test object during the pivotal movement of said feeler, means for then retracting said slides together with said feeler from said test object, means for pivoting said feeler from its end position back to its starting position during the retraction of said slides, and means controlled by said feeler for actuating said advancing and retracting means.

2. An apparatus as defined in claim 1 wherein said measuring means include a variable condenser having one coating mounted on said main slide and the other coating mounted on and movable with said second slide and relative to said first coating so that any movement of said second slide will result in changes in the capacity of said condenser, a heterodyne circuit for electrically evaluating said changes, and means for recording said changes.

3. An apparatus as defined in claim 1, in which said means controlled by said feeler includes an electric switch operatively associated with said feeler so as to be actuated thereby to actuate said retracting means when said feeler during its pivotal movement has passed beyond said masuring position.

4. An apparatus as defined in claim 1, in which said means for pivoting said feeler back to its starting position includes a lever pivotably mounted on said slide, one end of said lever being flexibly connected with said feeler, and an adjustable stop member mounted on a stationary part of said apparatus whereby, when said feeler has reached said end position and disengages from said test object and when said slide is then retracted, the other end of said lever engages with said stop member so that said lever is pivoted and thereby pivots said feeler back to its starting position.

5. An apparatus as defined in claim 1, in which said means for pivoting said feeler back to its starting position includes a lever pivotably mounted on said slide, one end of said lever being flexibly connected with said feeler, and an adjustable stop member mounted on a stationary part of said apparatus whereby, when said feeler has reached said end position and disengages from said test object and when said slide is then retracted, the other end of said lever engages with said stop member so that said lever is pivoted and thereby pivots said feeler back to its starting position, and said means for actuating said retracting means includes an electric switch operatively associated with said feeler so as to be actuated thereby to actuate said retracting means when said feeler during its pivotal movement has passed beyond said measuring position, said switch being adapted again to be actuated by said feeler to actuate said advancing means when said feeler is pivoting back to its starting position.

6. An apparatus as defined in claim 1, in which said means for pivoting said feeler back to its starting position includes a lever pivotably mounted on said slide, one end of said lever being flexibly connected with said feeler, an adjustable stop member mounted on a stationary part of said apparatus whereby, when said feeler has reached said end position and disengages from said test object and when said slide is then retracted, the other end of said lever engages with said stop member so as to initiate a pivotal movement of said lever and thus also a pivotal movement of said feeler in the direction back toward its starting position, a second adjustable stop member for determining said starting position, and a spring member acting upon said other end of said lever to flip said partly pivoted lever quickly in a manner similar to a toggle switch and thus to swing said feeler quickly into engagement with said second stop member.

7. An apparatus as defined in claim 1, wherein said means for periodically advancing and retracting said slide comprise a pair of electromagnets each having an armature, said armatures being connected with each other for common movement and also connected with said slide for moving the same, a switch operatively associated with said feeler so as to be actuated thereby to actuate one of said electromagnets so as to retract said slide when said feeler during its pivotal movement has passed beyond said measuring position and toward said end position, means for pivoting said feeler back toward its starting position when it has reached said end position and disengages from said test object and when said slide is then retracted, said switch being adapted again to be actuated by said feeler to actuate the other electromagnet so as to advance said slide when said feeler is pivoting back to its starting position.

8. An apparatus as defined in claim 7, further comprising a cylinder, a piston slidable within said cylinder and connected to said armatures so as to act as a shock absorber to steady the periodic movements of said slide.

9. An apparatus as defined in claim 1, wherein said means for periodically advancing and retracting said slide comprise an electric motor, a pinion driven by said motor, a rack in geared engagement with said pinion and connected with said slide for moving the same, a switch operatively associated with said feeler so as to be actuated thereby for connecting said motor to rotate in one direction to retract said slide when said feeler during its pivotal movement has passed beyond said measuring position, means for pivoting said feeler back toward its starting position when it has reached said end position and disengages from said test object and when said slide is then retracted, said switch being adapted again to be actuated by said feeler for reversing the direction of rotation of said motor so as to advance said slide when said feeler is pivoting back to its starting position, and means for disconnecting and stopping said motor substantially during the period in which said feeler is in engagement with said test object.

10. An apparatus as defined in claim 1, further comprising a stop member for limiting the advancing movement of said slide, said means for periodically advancing and retracting said slide comprising an electric motor, a pinion driven by said motor, a rack in geared engagement with said pinion, a compression spring interposed between and connecting said rack and said slide for moving said slide so that said rack after advancing said slide into engagement with said stop member is capable of carrying out a supplemental advancing movement of its own by compressing said spring, a switch operatively associated with said feeler so as to be actuated thereby for connecting said motor to rotate in one direction to retract said slide when said feeler during its pivotal movement has passed beyond said measuring position, means for pivoting said feeler back toward its starting position when it has reached said end position and disengages from said test object and when said slide is then retracted, said switch being adapted again to be actuated by said feeler for reversing the direction of rotation of said motor so as to advance said slide when said feeler is pivoting back to its starting position, and a switch connected with said rack and actuated thereby for disconnecting and stopping said motor during the supplemental advancing movement of said rack.

11. An apparatus as defined in claim 10, further comprising means for adjusting the speed of said motor.

References Cited in the file of this patent

UNITED STATES PATENTS

| 2,367,004 | Chitwood | Jan. 9, 1945 |
| 2,775,041 | Pomernacki | Dec. 25, 1956 |

FOREIGN PATENTS

| 424,744 | Italy | Sept. 2, 1947 |